Nov. 20, 1951     K. H. DITTMANN     2,575,492
FLOW-MEASURING APPARATUS
Filed April 13, 1946
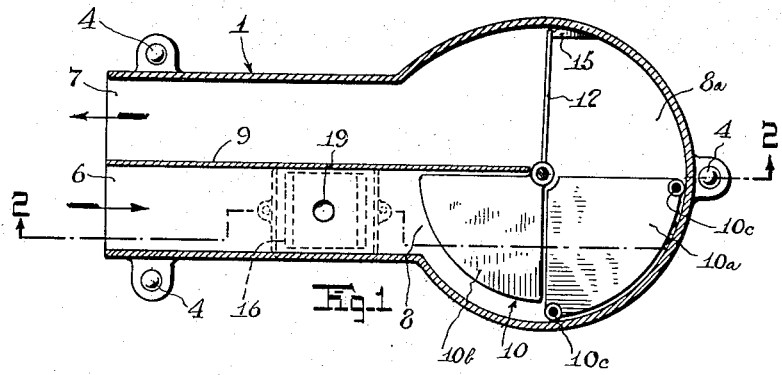
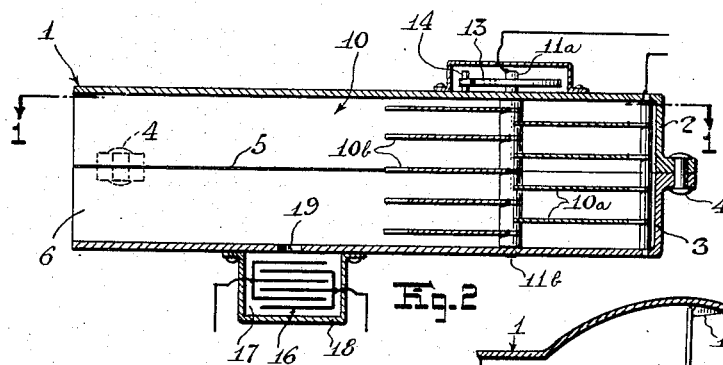
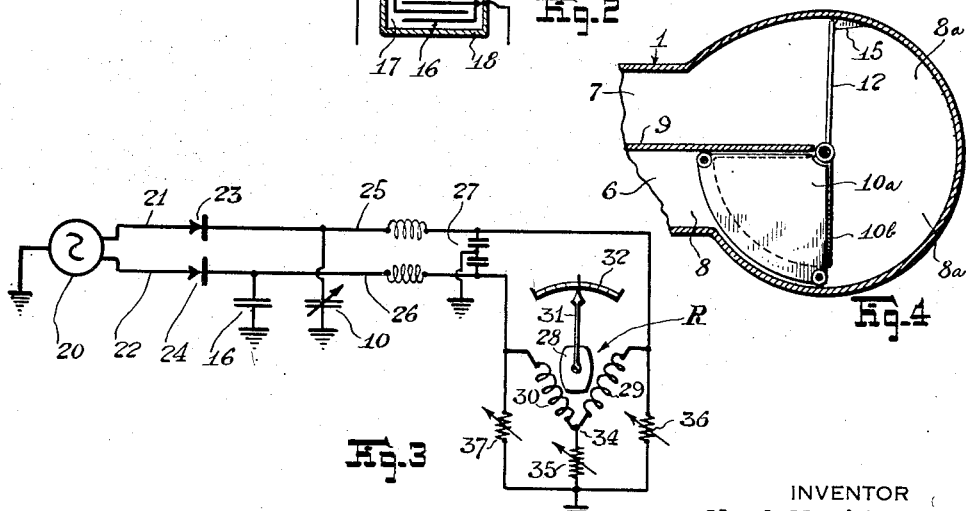
INVENTOR
Karl H. Dittmann
By
ATTORNEY Patented Nov. 20, 1951

2,575,492

UNITED STATES PATENT OFFICE 2,575,492

FLOW-MEASURING APPARATUS

Karl H. Dittmann, Mendham, N. J., assignor to Thomas A. Edison, Incorporated, West Orange, N. J., a corporation of New Jersey Application April 13, 1946, Serial No. 661,924

8 Claims. (Cl. 73—228)

This invention relates to a novel apparatus for measuring rate of flow, and more particularly to an improved apparatus which is adapted to measure accurately the effective flow of a particular fluid—i. e., the mass rate of flow of a fluid as determined by the product of its actual volume and density in which are entrained vapors, gases or other matter.

In measuring the rate of gasoline consumption on aircraft errors are often produced because of air bubbles entrained in the gasoline drawn from the tank. It is an object of my invention to provide an improved rate-of-flow measuring apparatus which is adapted to give accurate readings in terms of actual fuel consumption irrespective of whether or not any air, vapor or other matter is entrained in the fuel stream to the tank.

It is another object to provide a flow-measuring system which is compensated to correct for varying density of the fluid under measurement.

It is another object to provide a flow-measuring system which indicates in terms of the relative characteristics of the fluid in the stream and another portion of the fluid which is in a quiescent state.

It is another object to provide a system of the capacitance type for measuring the effective flow of a fluid material, and it is a further object to provide such a measuring system which operates independently of moderate changes in the dielectric constant of that material.

Another object is to provide a capacitance type of flow-measuring apparatus which operates on the ratio principle.

These and other objects and features of my invention will be apparent from the following description and the appended claims.

In the description of my invention reference is had to the accompanying drawings, of which:

Figure 1 is a sectional view, taken substantially on the line 1—1 of Figure 2, showing a capacitance-type rate-of-flow detecting apparatus according to my invention;

Figure 2 is a section taken substantially on the line 2—2 of Figure 1;

Figure 3 is a schematic view of an indicating system incorporating the detecting apparatus of the foregoing figures; and Figure 4 is a fractional view similar to Figure 1 showing an alternative embodiment of my invention.

The present rate-of-flow detecting apparatus has a housing 1 comprising two similar sections 2 and 3. These sections are clamped together by rivets 4 and are sealed fluid-tight to each other by an intervening gasket 5. The housing has inlet and outlet openings 6 and 7 which are interconnected by way of a duct 8 having a portion 8a that is curved back on itself at the inner end of the housing, the two inlet and outlet ducts being separated by a partitioning wall 9.

Within the duct 8, at the inlet side of the curved portion 8a thereof, there is a variable spaced-plate condenser 10 which comprises a stationary set of spaced sector-shaped plates 10a and a movable set of intervening plates 10b. The stationary set is carried insulatedly on posts 10c. The movable set is carried by a transverse shaft 11 which has its ends 11a and 11b journalled in the housing sections (Figure 2). To this shaft there is secured a vane 12, and to one shaft end 11a there is secured a torsional spring 13 which is anchored at 14 to the housing so as to urge the vane clockwise against a stop 15 (Figure 1). In the initial position of the vane, the same stands at right angles to the wall 9 and closes the duct 8a at its outlet side; also, in this initial position of the vane the movable plates 10b are in their outermost positions relative to the stationary plates 10a with the result that the condenser 10 then has its minimum capacitance value. As the vane is turned counterclockwise from its closed position, the outer edge thereof moves progressively away from the adjacent side wall of the housing to cause the duct 8 to be progressively opened. When a fluid is passed through the duct 8 the vane is deflected counterclockwise, against the force of the torsional spring 13, according to the volume rate of flow of that fluid; likewise, the plates 10b are moved between the adjacent stationary plates 10a to increase correspondingly the capacity of the condenser 10.

The dielectric for the variable condenser 10 is the fluid under measurment. The capacity of the condenser 10 therefore depends upon the dielectric constant of this fluid as well as on the state of the fluid—i. e., whether or not it has any gases, vapor or other matter entrained therein. Accordingly, the capacity of the condenser 10 is a function not only of the rate of fluid flow but also of the state of that fluid.

In accordance with my invention, rate-of-flow indications are made by comparing the capacity of the variable condenser 10 with that of a standard condenser 16. This condenser 16 is also of the spaced-plate type having the fluid that is being measured as its dielectric, but is placed in a portion of that fluid out of the fluid stream, which is in a quiescent state. Suitably, this condenser may be in a chamber 17 formed by a cup 10 that is clamped to the housing section 3 (Figure 2). This chamber communicates with the duct 8 through an opening 19 in the housing section 3.

On aircraft, because of quick changes in rate of climb, banking, etc., the liquid stream from the fuel tank tends to become entrained with air. Systems which measure volume rate of fluid flow give erroneous indications under these conditions because of the entrained air. The present system is adapted however to correct for the entrained air so as to give indications in terms of true or effective fuel flow.

The response of the vane 12 to fluid flow through the housing 1 is little influenced by whether that fluid is all fuel or the fuel has a substantial amount of entrained air, the position of the vane 12 being merely a function of the volume rate of fluid flow. However, the capacity of the condenser 10 is dependent upon the amount of entrained air because the fuel under measurement forms the dielectric for the condenser and air has a dielectric constant which is approximately half that of gasoline. Thus, at any position of the vane, the capacity of the condenser 10 will decrease as the percentage of entrained air increases. Since this direction of capacity change is the same as that caused when the volume rate of flow is reduced, the dielectric influence on the condenser by the fluid is a compensating one tending to cause the capacity of the condenser to be truly indicative of the actual or effective flow of gasoline through the housing. The standard condenser 16, being out of the fuel stream, is immersed always in fuel free from air bubbles, and has a value dependent only on the dielectric constant of the fuel itself. Thus, the ratio of the capacities of the condensers 10 and 16 is proportional to the effective rate of flow irrespective of the amount of entrained air in the fuel and of the dielectric constant of that fuel.

For indicating the rate of flow in terms of the ratio of capacities of the condensers 10 and 16, I preferably employ a capacity-measuring circuit (Figure 3) which is of the character described and claimed in the now abandoned application of John E. Lindberg, Serial No. 547,647. This circuit comprises an A.-C. source 20 of current, preferably one of radio frequency, which feeds out through two circuits 21 and 22 to respective rectifiers 23 and 24. From these rectifiers there are obtained pulsating direct currents which are passed through the condensers 10 and 16 respectively to ground. Across these condensers to ground are connected load circuits 25 and 26 respectively. These load circuits may include radio frequency filters generally referred to as 27. These load circuits draw load currents from the condensers the average values of which vary according to the average potentials on the condensers. Since these potentials vary according to the capacities of the condensers, it follows that the ratio of the load currents is proportional to the ratio of the capacities of the condensers.

A ratiometer R is provided for measuring the ratio of the load currents. This ratiometer may suitably be of the character described in Patent No. 2,362,562 issued in the name of Frederick G. Kelly November 14, 1944. For the present purpose this ratiometer is sufficiently described as having a permanent-magnet rotor 28 which is pivoted for movement within superimposed fields of two coils 29 and 30. These coils are at angles to each other so that the magnet will seek varying positions according to the relative field strengths of the coils. Secured to the shaft of the magnet is a pointer 31 which registers with a scale 32 that is calibrated in terms of rate of flow.

The coils 29 and 30 are connected in series across the load circuits. From the common junction 34 between the coils there is connected a resistor 35 to ground and from the junctions of the coils 29 and 30 with the load circuits there are respective resistors 36 and 37 connected also to ground.

The operation of this measuring circuit is as follows: As the capacity of the condenser 10 varies the voltage across the standard condenser 16 remains fixed, as does also the load current in the circuit 26, assuming of course that the voltage source 20 does not vary. (If the voltage source should vary, it will cause the potential across both condensers to vary alike so that the ratio of their voltages does not change.) The load current variations in the circuit 25 cause corresponding current variations in the ratio of the currents in the coils 29 and 30. These changes in the ratio of the coil currents produce deflections of the magnet 28 so that the pointer 31 indicates on the scale 32 the rate of flow. It may be noted that the resistor 35 controls the scale spread of the ratiometer—i. e., the angular deflection of the pointer per unit change in rate of flow—and that the resistors 36 and 37 control respectively the "zero" and "full" scale indicating positions of the pointer as disclosed in the Lindberg application abovementioned. For these reasons these resistors are preferably adjustable as indicated.

I have herein particularly described my invention in terms of the measurement of gasoline having therein varying amounts of entrained air. It will however be understood that my invention is applicable to the measurement of any fluid of a substantially non-conductive character wherein there is entrained any matter, gaseous or solid, other than the fluid itself so long as the dielectric influence of that matter on the variable condenser 10 is to decrease the capacity of the condenser with increase in percentage content of that matter. On the other hand, if the dielectric effect of that matter on the condenser is to increase the capacity of the condenser my measuring system is readily adapted to correct also for this condition so as to give true readings of rate of flow of the actual fluid under measurement by arranging the condenser 10 so that with increasing rate of fluid flow the capacity of the condenser is decreased. This is accomplished simply by shifting the stationary plates 10a 90° clockwise as illustrated in Figure 4.

I have herein particularly described my invention in terms of certain preferred embodiments, but these will be understood to be illustrative and not limitative of my invention as the same is subject to changes and modifications without departure from the scope of my invention, which I endeavor to express according to the following claims.

I claim:

1. In a metering system for measuring the flow of a fluid: the combination of apparatus having a flow passageway for said fluid, an electrical condenser comprising a stationary set of spaced plates and a pivoted set of intervening plates, the spaces between said plates being filled with said fluid, and a pivotally-mounted vane in said passageway connected to said pivoted set of plates, said vane being biased into a passageway-closing position and responsive to variations in the flow of said fluid for producing a corresponding variation in said condenser.

2. In a metering system for measuring the flow of fluid: the combination of apparatus having a curved passageway for said fluid, an electrical condenser in one portion of said passageway comprising a stationary set of spaced plates parallel to the fluid stream and a pivoted set of spaced plates interleaved therewith, a vane in another portion of said passageway connected to said pivoted set of plates and responsive to the fluid flow to vary said condenser, said vane having a position wherein it closes said passageway and being pivotally movable to progressively open said passageway, and said condenser being arranged to have its minimum value when said vane is in its closed position.

3. In a metering system for measuring the flow of a fluid: the combination of a conduit having a portion curved on an arc about an axis at a side wall of the conduit and having a rectilinear portion leading from said curved portion; an electrical condenser in said conduit comprising a stationary set of spaced plates substantially parallel to the direction of fluid flow and a movably-mounted set of plates intervening said stationary plates, the spaces between said plates forming a passageway for the fluid under measurement and said fluid constituting a dielectric medium for said condenser; a vane pivoted at said axis and biased into a conduit-closing position wherein the vane conforms to the interior wall of said curved portion of said conduit, said vane being movable by fluid pressure in a direction towards said rectilinear portion to open said conduit progressively as the fluid flow increases therein; and means connecting said vane to said movable set of intervening plates to cause the electrical capacity of said condenser to be varied according to the positioning of said vane.

4. In a metering system for indicating the effective rate of flow of a fluid: the combination of apparatus having a flow passageway for said fluid and a chamber positioned out of said passageway and communicating therewith, a variable condenser in said passageway responsive to variations in the dielectric constant of said fluid, means responsive to the fluid in said passageway according to the volume rate of flow thereof for varying the capacity of said variable condenser, a standard condenser in said chamber responsive to the dielectric constant of the fluid in said chamber, and means for producing indications according to the ratio of the capacities of said condensers.

5. In an electrical metering system for measuring the rate of flow of a fluid: the combination of apparatus having a flow passageway for said fluid, a variable electrical condenser immersed in the fluid within said passageway and having a dielectric comprising said fluid, a standard electrical condenser having a dielectric comprising also said fluid, means responsive to the fluid in said passageway according to the rate of flow thereof for varying said variable condenser, and indicating means connected to said condensers and responsive according to the ratio of their capacities.

6. In an electrical metering system for measuring the rate of flow of a fluid: the combination of apparatus having a flow passageway for said fluid, a variable spaced-plate condenser in said passageway having a dielectric comprising the fluid stream, a standard spaced-plate condenser having a dielectric comprising a portion of the fluid which is out of said stream, means responsive to the fluid flow in said passageway for proportionately varying said variable condenser according to the volume flow rate, and means, responsive to the ratio of the capacities of said condensers, for indicating the rate of the fluid flow.

7. In an electrical metering system for measuring the mass rate of flow of a particular fluid of non-conductive character in which is entrained matter having a smaller dielectric constant than that of the fluid being measured: the combination of apparatus having a flow passageway for said fluid and entrained matter, a variable electrical condenser immersed in the fluid within said passageway and having a dielectric comprising said fluid and entrained matter; a standard electrical condenser having a dielectric comprising a portion of said fluid out of said passageway; means operable by the fluid in said passageway to increase the capacity of said variable condenser with increase in the volume rate of flow of said fluid and entrained matter; and indicating means connected to said condensers and responsive according to the ratio of their electrical capacities.

8. In an electrical metering system for measuring the mass rate of flow of a particular fluid of non-conductive character in which is entrained matter having a greater dielectric constant than that of the fluid being measured: the combination of apparatus having a flow passageway for said fluid and entrained matter, a variable electrical condenser immersed in the fluid within said passageway and having a dielectric comprising said fluid and entrained matter; a standard electrical condenser having a dielectric comprising a portion of said fluid out of said passageway; means operable by the fluid in said passageway to decrease the capacity of said variable condenser with increase in the volume rate of flow of said fluid and entrained matter; and indicating means connected to said condensers and responsive according to the ratio of their electrical capacities.

KARL H. DITTMANN.

REFERENCES CITED

The following references are of record in the file of this patent:

UNITED STATES PATENTS

| Number | Name | Date |
|---|---|---|
| 1,401,299 | Wohlenberg | Dec. 27, 1921 |
| 1,912,188 | Gann | May 30, 1933 |
| 2,082,539 | Fischer | June 1, 1937 |
| 2,266,316 | Martin et al. | Dec. 16, 1941 |
| 2,377,275 | Smith | May 29, 1945 |

FOREIGN PATENTS

| Number | Country | Date |
|---|---|---|
| 333,625 | Great Britain | Aug. 18, 1930 |